Feb. 10, 1925.                                                      1,526,281
F. A. HERTZER
SINGLETREE CLIP
Filed Oct. 4, 1923

F. A. Hertzer INVENTOR

WITNESSES

Patented Feb. 10, 1925.

1,526,281

UNITED STATES PATENT OFFICE.

FRED A. HERTZER, OF DIXIE, WASHINGTON.

SINGLETREE CLIP.

Application filed October 4, 1923. Serial No. 666,631.

*To all whom it may concern:*

Be it known that I, FRED A. HERTZER, a citizen of the United States, residing at Dixie, in the county of Walla Walla and State of Washington, have invented new and useful Improvements in Singletree Clips, of which the following is a specification.

This invention relates to improvements in singletree clips and has for an object the provision of a clip which may be removably secured to a singletree and adjusted when necessary to tighten the same without the aid of a skilled workman.

Another object of the invention is the provision of a sectional clip of this character, wherein the parts subjected to wear may be readily removed, thereby rendering it unnecessary to provide an entirely new clip when only one part of the clip has become worn or useless.

With the above and other objects in view, the invention further includes the following novel features and details of construction, to be hereinafter more fully described, illustrated in the accompanying drawings and pointed out in the appended claims.

In the drawings:—

Figure 1:
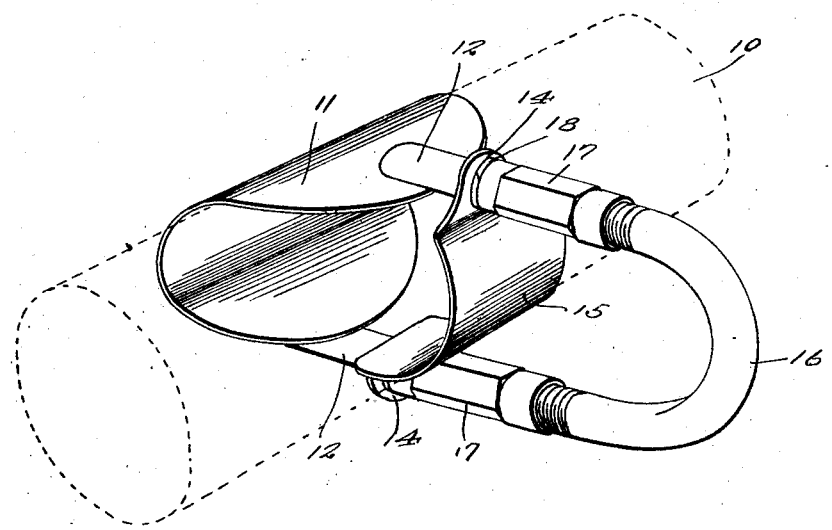
Figure 1 is a perspective view of the invention shown secured to a fragmentary portion of a singletree, the latter being indicated by dotted lines.
Figure 2:
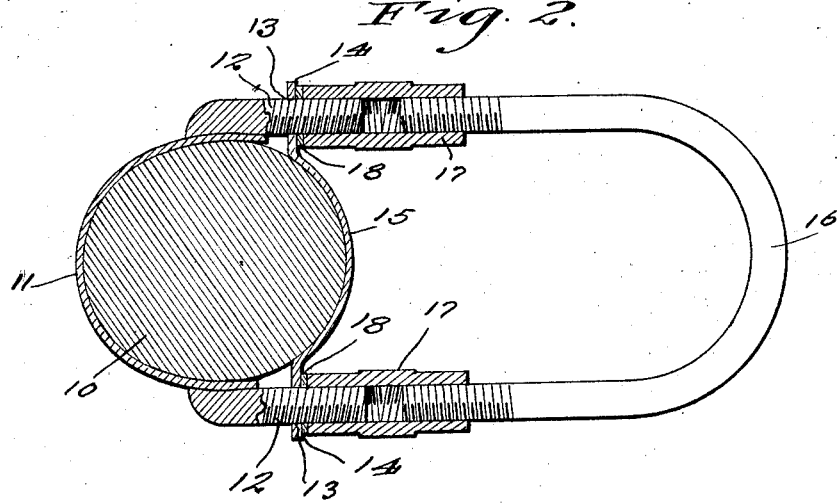
Figure 2 is a section taken substantially central of the clip and transversely of the singletree.

Referring in detail to the drawings, wherein like characters of reference denote corresponding parts, the reference character 10 indicates a fragmentary portion of a singletree to which the clip is shown as applied. The clip is formed in separate sections and includes a substantially U-shaped member or plate 11 which is shaped to conform to the transverse shape of the singletree and which has extending therefrom threaded studs 12. These studs are adapted to pass through apertures 13 provided in ears 14 and the latter extend from the opposite ends of a curved plate 15. This plate is adapted to be secured upon the studs 12 to provide means for holding the U-shaped member 11 in place, whereby a connecting member in the form of a U bolt 16 may be secured to the singletree. The bolt 16 is adapted for connection with a hook or similar member whereby the singletree may be secured in place.

The ends of the bolt 16 are threaded and connecting the ends of the bolt and the threaded ends of the studs 12 are coupling members 17 whose opposite ends are internally threaded. By this means the bolt 16 may be removably secured in place so that it may be replaced when necessary. In addition to providing attaching means for the bolt 16, the coupling members 17 provide means for adjustably securing the clip to the singletree in that they may be utilized to draw the U-shaped member 11 and the plate 15 together so as to initially adjust the clip in position and to take up play occasioned by shrinkage of the singletree. It is preferred to position lock washers 18 between the apertured ears 14 and the adjacent ends of the coupling members 17. These coupling members are provided with wrench engaging portions as shown.

The invention is susceptible of various changes in its form, proportions and minor details of construction and the right is herein reserved to make such changes as properly fall within the scope of the appended claims.

Having described the invention what is claimed is:—

1. A singletree clip embodying a substantially U-shaped member including threaded studs, an apertured plate engageable over the studs and co-operating with the U-shaped member to embrace a singletree and provide a clip, a U-shaped connecting bolt and combined means for adjustably securing the clip in place and detachably engaging the ends of the U-shaped bolt.

2. A singletree clip embodying a substantially U-shaped member including threaded studs, an apertured plate engageable over the studs and co-operating with the U-shaped member to embrace a singletree and provide a clip, a U-shaped connecting bolt and coupling members having one of their ends threadedly engaging the studs and bearing against the apertured plate for adjustably securing the clip in place and their opposite ends detachably connected to the ends of the U-shaped bolt.

FRED A. HERTZER.